(12) United States Patent
Fernandez

(10) Patent No.: US 12,472,304 B2
(45) Date of Patent: Nov. 18, 2025

(54) ADAPTIVE NEURO-FUZZY INFERENCE SYSTEM FOR CLOSED LOOP TOTAL INTRAVENOUS ANESTHESIA MANAGEMENT

(71) Applicant: SmartTIVA, Inc., Rockville, MD (US)

(72) Inventor: Juan Fernandez, Rockville, MD (US)

( * ) Notice: Subject to any disclaimer, the term of this patent is extended or adjusted under 35 U.S.C. 154(b) by 0 days.

(21) Appl. No.: 19/177,537

(22) Filed: Apr. 12, 2025

(65) Prior Publication Data

US 2025/0319253 A1    Oct. 16, 2025

Related U.S. Application Data

(60) Provisional application No. 63/633,168, filed on Apr. 12, 2024.

(51) Int. Cl.
| | | |
|---|---|---|
| *A61M 5/172* | (2006.01) | |
| *G06N 3/043* | (2023.01) | |

(52) U.S. Cl.
CPC .......... *A61M 5/1723* (2013.01); *G06N 3/043* (2023.01); *A61M 2202/048* (2013.01); *A61M 2230/10* (2013.01); *A61M 2230/20* (2013.01); *A61M 2230/42* (2013.01); *A61M 2230/43* (2013.01)

(58) Field of Classification Search
CPC .......... A61B 5/4821; A61B 2560/223; A61M 5/1723; G16H 20/13; G16H 20/17; G16H 20/40
See application file for complete search history.

(56) References Cited

U.S. PATENT DOCUMENTS

| | | |
|---|---|---|
| 7,925,338 B2 | 4/2011 | Huiku |
| 8,038,642 B2 | 10/2011 | Tolvanen-Laakso et al. |
| 9,849,241 B2 | 12/2017 | Becker |
| 9,950,112 B2 | 4/2018 | Melker et al. |
| 10,130,766 B1 | 11/2018 | Bibian et al. |
| 10,595,772 B2 | 3/2020 | Burton |
| 11,322,248 B2 | 5/2022 | Grantcharov et al. |
| 11,452,480 B2 | 9/2022 | Jensen et al. |
| 11,589,824 B2 | 2/2023 | Jensen et al. |
| 11,883,631 B2 | 1/2024 | Dumont et al. |
| 2019/0374158 A1 | 12/2019 | Brown et al. |

(Continued)

FOREIGN PATENT DOCUMENTS

| | | |
|---|---|---|
| AU | 2021100883 A4 | 4/2021 |
| BR | 102019018250 A2 | 3/2021 |

(Continued)

OTHER PUBLICATIONS

Tian, Ye, Zheng Chu, and Gang Ma. "Fuzzy logic control theory in clinical anesthesia." Expert Systems 39.3 (2022): e12761.
Joosten, Alexandre, et al. "Anesthetic management using multiple closed-loop systems and delayed neurocognitive recovery: a randomized controlled trial." Anesthesiology 132.2 (2020): 253.

(Continued)

*Primary Examiner* — Manuel A Mendez
(74) *Attorney, Agent, or Firm* — U. Maryland Carey School of Law

(57) ABSTRACT

An Adaptive Neuro-Fuzzy Inference System (ANFIS) for total intravenous anesthesia management is disclosed, enabling control over administration of anesthetic agents and dynamic adjustment according to patient physiological feedback. The system processes patient data, including processed EEG signals, hemodynamic information, capnography, and pulse oximetry, to facilitate real-time anesthetic dosage adjustments.

17 Claims, 9 Drawing Sheets

(56) References Cited

U.S. PATENT DOCUMENTS

| | | | |
|---|---|---|---|
| 2020/0383647 A1* | 12/2020 | Freeman | ............... A61B 5/7264 |
| 2021/0076966 A1 | 3/2021 | Grantcharov et al. | |
| 2022/0143316 A1 | 5/2022 | Althoff | |
| 2023/0355171 A1 | 11/2023 | Rodriguez Herrero et al. | |
| 2024/0216610 A1 | 7/2024 | Dumont et al. | |

FOREIGN PATENT DOCUMENTS

| | | |
|---|---|---|
| CN | 201049110 Y | 4/2008 |
| CN | 201049111 Y | 4/2008 |
| CN | 113509610 A | 10/2021 |
| CN | 117018341 A | 11/2023 |
| CN | 114366934 B | 12/2023 |
| CN | 117423428 B | 2/2024 |
| CN | 115105681 B | 5/2024 |
| CN | 118629649 A | 9/2024 |
| CO | 15237754 | 10/2015 |
| WO | 2023233216 A1 | 12/2023 |
| WO | 2024039748 A1 | 2/2024 |

OTHER PUBLICATIONS

Dumont, Guy A. "Closed-loop control of anesthesia-a review." *IFAC Proceedings Volumes* 45.18 (2012): 373-378.

Mahfouf, Mahdi, et al. "Modelling and multivariable control in anaesthesia using neural-fuzzy paradigms: Part II. closed-loop control of simultaneous administration of propofol and remifentanil." *Artificial Intelligence in Medicine* 35.3 (2005): 207-213.

Casas-Arroyave, Fabián David, Juan Manuel Fernández, and John Jairo Zuleta-Tobón. "Evaluation of a closed-loop intravenous total anesthesia delivery system with BIS monitoring compared to an open-loop target-controlled infusion (TCI) system: randomized controlled clinical trial." *Colombian Journal of Anesthesiology* 47.2 (2019): 84-91.

Oquendo, Francisco Javier Gómez, et al. "Anestesia total intravenosa en un sistema de lazo cerrado: reporte del primer caso en Colombia." *Revista Colombiana de Anestesiología* 41.4 (2013): 306-310.

Castellanos Peñaranda, Claudia, et al. "Technical and clinical evaluation of a closed loop TIVA system with SEDLine TM spectral density monitoring: Multicentric prospective cohort study." *Perioperative Medicine* 9 (2020): 1-11.

\* cited by examiner

ADAPTIVE NEURO-FUZZY INFERENCE SYSTEM FOR CLOSED LOOP TOTAL INTRAVENOUS ANESTHESIA MANAGEMENT

CROSS-REFERENCES TO RELATED APPLICATIONS

This application claims the benefit of U.S. Application Ser. No. 63/633,168, filed Apr. 12, 2024, the contents of which are hereby incorporated by reference.

BACKGROUND OF INVENTION

Field of the Invention

The present invention relates to the field of medical systems for automated anesthesia management, specifically employing Adaptive Neuro-Fuzzy Inference Systems (ANFIS) to develop fuzzy logic controllers for anesthetic fluids

Related Art

In the progression dedicated to the closed-loop administration of anesthetic agents, this document represents the third patent developed by the inventor in this area of medicine. Building upon the foundational principles established in the earlier patents, this latest invention further refines the methodology and application of automated systems for the delivery of anesthesia.

Document CO 15237754 introduces an innovative closed-loop intravenous total anesthesia delivery system. This foundational system emphasizes the collection and processing of vital signs and anesthetic depth information to dynamically modulate dosages of anesthetic medications. It delineates a process encompassing the selection of anesthetic agents, determination of their effect target concentration, and monitoring the resultant depth of anesthesia. Crucially, it advances a method for adjusting medication dosages in real time, based on the patient's transition between states of anesthesia. This is achieved through the application of a fuzzy logic model, which processes patient data taken from anesthesia monitors to infer the patient's level of depth and pain to adjust the medication's effective site concentration during the maintenance phase.

Progressing from this initial invention, document CO 2022007433 A1 and its international counterpart, WO/2023/233216, published Dec. 7, 2023, the contents of which are hereby incorporated by reference, detail a more elaborate computer-implemented system for anesthetic fluid flow control. This method broadens the scope of input data to include comprehensive demographic and physiological patient profiles, in addition to a wider range of pEEG variables like PSI SEF, EMG and SR and variable heart rate and arterial pressure. Through a pharmacokinetic processing method, the system configures an anesthetic fluid infusion pump, which is subsequently fine-tuned based on real-time status data indicative of the patient's anesthetic and cerebral conditions. Notably, the documents introduce a sophisticated control process that leverages fuzzy control methodologies to meticulously adjust the pump's settings, thereby maintaining the patient within a specified anesthetic threshold range.

The present invention stands as an innovation in this domain, incorporating Adaptive Neuro-Fuzzy Inference Systems (ANFIS) into the control system for anesthetic agents such as Propofol, Fentanyl, Remifentanil, Dexmedetomidine, Ketamine, Magnesium Sulfate, benzodiazepines, Lidocaine and other intravenous anesthetic agents. This advanced approach merges the interpretive flexibility of fuzzy logic with the adaptive learning capabilities inherent to neural networks. As a result, the document describes the way in which the system can be trained and developed. This achieves a level of dosage tuning similar to those of expert anesthesiologists with a higher frequency, extending its applicability to a wider array of pharmaceuticals and enhancing patient-specific anesthesia management.

These documents collectively would constitute a patent family, tracing the development from preliminary closed-loop systems to the incorporation of computational and AI techniques in anesthesia management. The introduction of the ANFIS methodology into the control system is specifically designed to replicate the decision-making processes of experienced anesthesiologists. This system is structured to learn and adapt based on both simulated scenarios and real-world clinical data. By incorporating this learning mechanism, the ANFIS approach directly integrates the complex judgment and expertise of professional anesthesiologists into its operational framework. The methodology ensures that the system's responses to changing physiological conditions are based on a robust retrospective dataset of expert decisions.

SUMMARY OF THE INVENTION

The present invention relates to an Adaptive Neuro-Fuzzy Inference System (ANFIS) designed for the management of total intravenous anesthesia, enabling the precise administration of Propofol, Fentanyl, Remifentanil, Dexmedetomidine, Ketamine, Magnesium Sulfate, benzodiazepines, Lidocaine and other intravenous anesthetic agents. This system assimilates and analyzes critical patient-specific data—including processed electroencephalogram (EEG) signals, hemodynamic metrics, capnography, and pulse oximetry readings—to dynamically adjust anesthetic dosages in real-time, according to the patient's physiological condition.

Aspects of the invention may aim to replicate and automate the decision-making processes traditionally executed by expert anesthesiologists at a higher frequency. This is achieved by initially defining membership functions and parameters based on the specifications from medical monitoring device manufacturers, with subsequent adjustments derived from the empirical analysis of anesthesiology experts' decisions. This allows for the tuning of membership functions and variable weights, enhancing the system's capability to predict and implement effective dosage adjustments.

A first feature of the system is its approach to managing Propofol levels, utilizing input membership functions that classify hypnotic states into suppressed, deep anesthesia, optimal anesthesia, sedation, and awake. These classifications are calibrated to capture the expert's decision-making, especially in the range of optimal anesthesia.

Embodiments of the invention may delineate a dual-response control method for adjusting the hypnotic level of patients: a rapid response mechanism employing small consecutive adjustments based on real-time EEG parameters and a slower response that implements more substantial changes based on a comprehensive EEG anesthetic depth index. This methodology ensures a responsive administration of anesthesia, aiming to improve patient safety and surgical outcomes.

Moreover, the system incorporates an iterative process for refining both input and output membership functions and their associated weights, based on expert feedback. This adjustment, supported by a training and validation protocol, ensures the system's recommendations align with expert-level decision-making. In certain embodiments, end-user modification is precluded, thus maintaining consistency and reliability in its operational performance.

Once training is completed, the model is frozen and may be used, by a patient monitor, infusion pump, or anesthesia machine during an actual anesthetic procedure.

According to aspects of embodiments of the invention, there may be provided a system for automated anesthetic or sedation drug delivery to a patient including: an infusion pump connectable to the patient and configured to deliver the drug to the patient at a controllable infusion rate; a patient monitor connectable to the patient to monitor a plurality of physiologic measures of the patient, including electroencephalogram (EEG) measures, hemodynamic parameters, capnography, and pulse oximetry; and a controller coupled to the infusion pump to control the controllable infusion rate and coupled to the patient monitor to receive the plurality of physiologic measures of the patient; where the controller is configured to adjust the infusion rate based on the plurality of physiologic measures of the patient by applying an Adaptive Neuro-Fuzzy Inference System (ANFIS) that has been trained on a retrospective dataset including a plurality of anesthesiologist decisions and physiologic conditions correlated to each of the anesthesiologist decisions, including EEG signals, hemodynamic parameters, capnography, and pulse oximetry; and where training the ANFIS includes adjusting fuzzy logic parameters thereof to arrive at an adapted final fuzzy set.

According to aspects of embodiments of the invention, there may be provided a system for automated anesthetic or sedation drug delivery to a patient including: one or more infusion pumps, each configurable to be in fluid communication with the patient to deliver a pump-specific drug to the patient at a drug-specific controllable infusion rate; a patient monitor connectable to the patient to monitor a plurality of physiologic measures of the patient, including electroencephalogram (EEG) measures; and a controller coupled to the one or more infusion pumps to control each of the drug-specific controllable infusion rates and coupled to the patient monitor to receive the physiologic measures of the patient; wherein the controller is configured to adjust each of the drug-specific infusion rates based on the physiologic measures of the patient by applying an Adaptive Neuro-Fuzzy Inference System (ANFIS) that has been trained on a dataset including a plurality of anesthesiologist decisions and physiologic conditions correlated to each of the anesthesiologist decisions, including EEG signals; wherein training the ANFIS includes adjusting fuzzy logic parameters thereof to arrive at an adapted final fuzzy set.

In some aspects, the techniques described herein relate to a system or method for automated anesthetic or sedation drug delivery to a patient where the physiologic measures and the physiologic conditions correlated to each of the anesthesiologist decisions further include hemodynamic parameters, capnography, and pulse oximetry.

In some aspects, the techniques described herein relate to a system or method for automated anesthetic or sedation drug delivery to a patient where the ANFIS is initialized with establishment of initial fuzzy logic parameters, defining and adjusting membership functions and rules based on expert anesthesiologist input and predefined clinical protocols.

In some aspects, the techniques described herein relate to a system or method for automated anesthetic or sedation drug delivery to a patient where the dataset represents one or both of (1) retrospective clinical patient anesthesia or sedation sessions data and (2) retrospective simulated anesthesia or sedation sessions.

In some aspects, the techniques described herein relate to a system or method for automated anesthetic or sedation drug delivery to a patient where the one or more infusion pumps are configurable to infuse a corresponding one or more of Propofol, Ketamine, Dexmedetomidine, and IV Lidocaine.

In some aspects, the techniques described herein relate to a system or method for automated anesthetic or sedation drug delivery to a patient in which the controller is further configured to adjust each of the one or more infusion pumps individually or in combination to achieve desired anesthesia or sedation levels without using opioids.

In some aspects, defining and adjusting membership functions and rules for both input variables and output variables covers clinical scenarios of general anesthesia, deep sedation, light sedation, opioid-free anesthesia, and constant muscle relaxation.

In some aspects, a patient monitor further monitors Train-Of-Four (TOF) measures of the patient, a pump-specific drug is a muscle relaxant drug, and the physiologic conditions in the dataset further include muscle relaxant anesthesiologist decisions and TOF conditions correlated to the muscle relaxant anesthesiologist decisions.

In some aspects, the techniques described herein relate to a system or method for automated anesthetic or sedation drug delivery to a patient where the physiologic measures and the physiologic conditions correlated to each of the anesthesiologist decisions further include respiratory status parameters such as CO2 curves, respiratory rate (RR), and oxygen saturation (SpO2).

In some aspects, the techniques described herein relate to a system or method for automated anesthetic or sedation drug delivery to a patient where the controller is further configured to defuzzify fuzzy logic outcomes to control a drug-specific controllable infusion rate.

In some aspects, the techniques described herein relate to a system or method for automated anesthetic or sedation drug delivery to a patient, where multiple infusion pumps are configured or configurable to infuse combinations of drugs selected from the group of combinations consisting of propofol+remifentanil+rocuronium/vecuronium for anesthesia, propofol+remifentanil for deep sedation or, light sedation, Dexmedetomidine for sedation, and ketamine+Dexmedetomidine+lidocaine for local anesthesia.

In some aspects, the techniques described herein relate to a system or method for automated anesthetic or sedation drug delivery to a patient with EEG measures and EEG signals including raw EEG data and its spectrogram trend and stability.

In some aspects, the techniques described herein relate to a system or method in which the physiologic measures and the physiologic conditions correlated to the anesthesiologist decisions further include hemodynamic parameters and one of the drugs is an analgesic.

In some aspects, the techniques described herein relate to a system or method in which the controller is further configured to utilize refined fuzzy parameters to adjust a target concentration of a pump-specific anesthetic drug based on an internationally accepted pharmacokinetic (PK) models and Target-Controlled Infusion (TCI) systems for administering said target concentration and dosage changes in real-time.

In some aspects, the techniques described herein relate to a method for configuring a controller to adjust drug-specific infusion rates based on patient physiologic conditions in an automated anesthetic or sedation drug delivery system including: associating input and output variables with respective membership functions and ranges according to fuzzy set specifications in an Adaptive Neuro-Fuzzy Inference System (ANFIS), said input variables including index of anesthesia depth, pEEG condition, hemodynamic condition, and respiratory condition and said output variables including target concentration change; defining membership functions for said input variables and output variables, said membership functions for input variables including suppressed, deep anesthesia, sedation, awake or high pain, low pain, high analgesia, low analgesia and said membership functions for output variables including decrease high, decrease low, maintain, increase low, increase high; implementing fuzzy logic rules to determine system interpretation of data associated with said input variables to adjust target concentration change to create an ANFIS model; training the ANFIS model on a dataset including a plurality of anesthesiologist decisions and patient physiologic conditions correlated to each of the anesthesiologist decisions; and validating and refining the ANFIS model by utilizing the controller in a clinical setting under anesthesia practitioner supervision, said refining including fine-tuning of membership functions and rule parameters to align with said supervision.

In some aspects, the techniques described herein relate to a method for providing automatically adjusted drug-specific infusion rates based on patient physiologic conditions using a trained and configured controller, the method including: connecting an infusion pump to a patient, the infusion pump configured to deliver a drug to the patient at a controllable infusion rate determined by the controller; connecting a patient monitor to the controller and to the patient to provide the controller with pEEG, hemodynamic condition, and respiratory condition; and providing an initial index or target to the controller.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
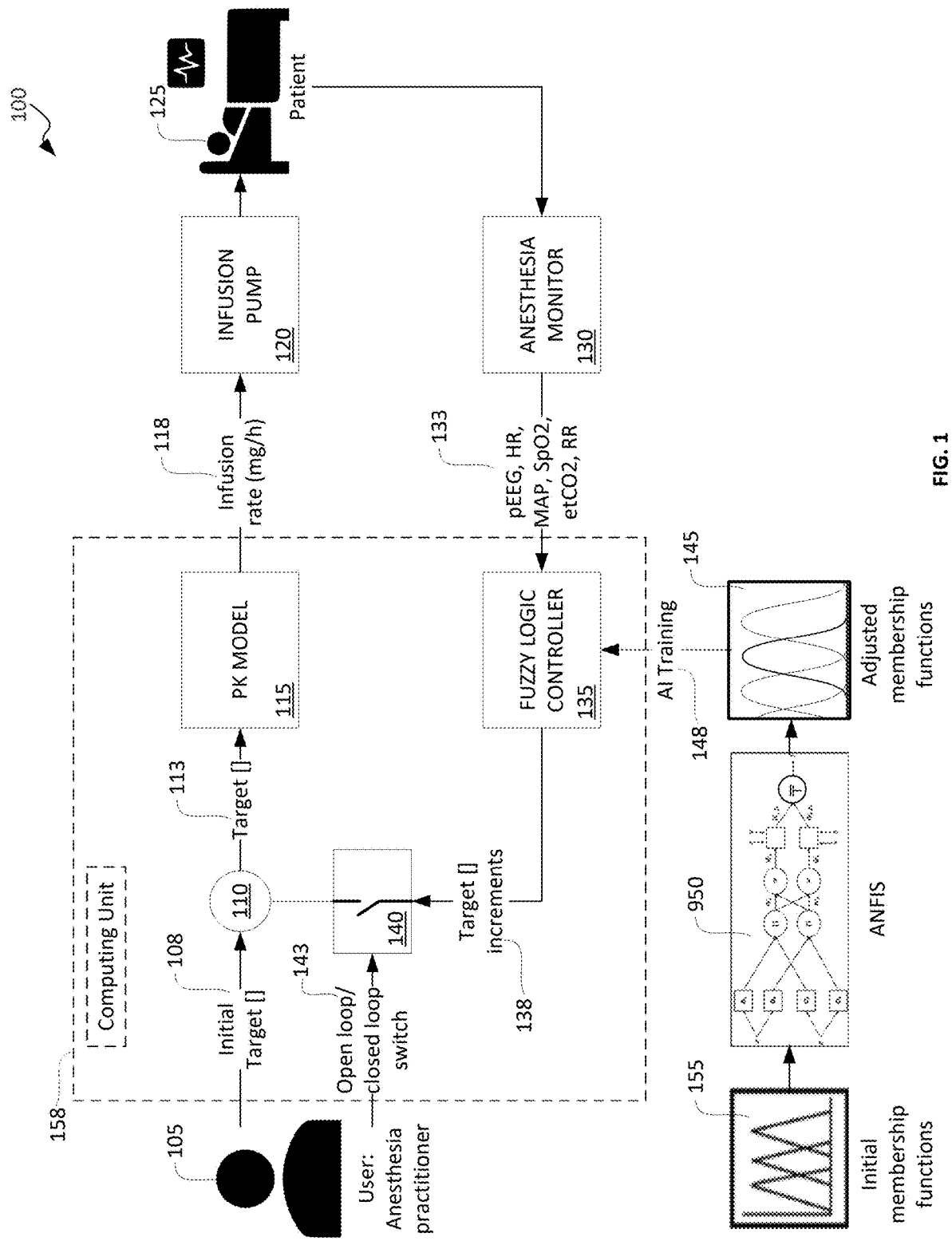
FIG. 1 illustrates aspects of a closed loop diagram, in conjunction with an ANFIS fuzzy controller training process.

With reference to FIG. 1, in accordance with aspects of the present invention, there is provided an Adaptive Neuro-Fuzzy Inference System (ANFIS) for total intravenous anesthesia management 100, enabling control over the administration of various anesthetic agents by dynamically adjusting to the patient's physiological feedback. The system may process patient data 133, including processed EEG signals, hemodynamic information, capnography, and pulse oximetry, to facilitate real-time anesthetic dosage adjustments.

Practitioner 105 may provide an initial target as an input 108 to summing point 110 and a loop switch setting 143 to open loop/closed loop switch 140. The summing point 110 provides target 113 to pharmacokinetic model 115 which provides an infusion rate 118 to infusion pump 120 which delivers the controlled dosage to patient 125. Anesthesia monitor 130 monitors physiologic conditions of patient 125 and provides the data to fuzzy logic controller 135 which determines target increments 138 based on AI training 148 which are then provided to open loop/closed loop switch 140 which, if closed, provides target increment 138 to summing point 110 to adjust the target 113.

Initial configurations of membership functions 155 and parameters may be based on medical device specifications, with subsequent refinements informed by expert analysis. This adaptive approach allows for the optimization of membership functions and variable weights, ensuring accurate dosage adjustments.

The system 100 may apply differentiated input membership functions to monitor anesthetic drug levels, categorizing them into various states. This includes a method for adjusting the hypnotic or unconsciousness level of patients through both fast and slow response mechanisms, based on real-time EEG data and a comprehensive EEG anesthetic depth index, respectively.

Aspects of the invention may outline a method for the iterative refinement of membership functions and weights, utilizing expert feedback to ensure the system's dosing recommendations align with expert decision-making. Through simulated scenarios and actual patient data, the system undergoes training, validation, and refinement, enhancing its efficacy in maintaining optimal anesthesia levels.

Furthermore, the system's architecture may be designed to prohibit end-user modifications post-deployment, ensuring consistent performance across various clinical settings. The inclusion of specific adjustments for heart rate and blood pressure variability facilitates tailored anesthesia delivery, particularly for analgesic anesthetic agents.

Operational dynamics of system 100 are illustrated, depicting the interaction between computing unit 158, patient 125 via infusion pump 120, and anesthesia monitor 130. This process ranges from establishing a target effect site concentration, through the induction phase based on initial drug effects, to the maintenance phase where adjustments are made based on continuous patient monitoring. The system's fuzzy logic controller may be trained with pre-adjusted membership functions 145, ensuring decision-making processes are refined and validated through expert collaboration, simulation and clinical application.

In addition to the described methodologies for hypnotic level management, aspects of the invention incorporate a parallel process for the adjustment of analgesic dosages, employing a similar framework of adaptive neuro-fuzzy inference. Initially, system 100 may establish membership functions and weights to categorize changes in heart rate and arterial pressure as either significant or minor. These initial settings may serve as the foundation for the system's ability to discern changes in hemodynamics that warrant an adjustment in analgesic drug dosing.

This adaptive mechanism is designed to utilize dynamic data rather than absolute values as inputs for analgesic dosage changes. This is an improvement over previous methods that relied on static values to assess analgesic needs or excesses, which could lead to continuous and potentially unsafe adjustments in dosing. By focusing on dynamic changes in patient-specific hemodynamic and neurophysiology parameters, the system can more accurately reflect the real-time analgesic needs of the patient, thereby avoiding the pitfalls of static index-based adjustments.

In addition to the methodologies for the management of hypnotic and analgesic levels, aspects of the invention further extend to adjustment of muscle relaxant dosages through the use of an adaptive neuro-fuzzy inference framework. This aspect of the system initiates by defining membership functions and weights to interpret changes in Train-Of-Four (TOF) monitoring data. These parameters enable the system to accurately assess the degree of neuromuscular blockade and identify whether changes in TOF counts indicate a need for either an increase or decrease in muscle relaxant dosing. This initial calibration provides for the system's capacity to evaluate neuromuscular transmission and ensure that adjustments in muscle relaxant delivery are both precise and responsive to the patient's current state of muscle relaxation.

The process of refining the membership functions and weights for analgesic and muscle relaxant dosage adjustments follows the protocol mirroring the approach used for hypnotic agents. This involves collecting empirical data on how expert anesthesiologists respond to various changes in the input data, indicating an adjustment in dosing. The system then iteratively adjusts its membership functions and weights based on this expert feedback, ensuring that the criteria for dosing changes align with those deemed significant by clinical experts.

ANFIS methodology is applied to iteratively adjust the membership functions for both input variables, such as but not limited to, slopes and changes of EEG patterns, BIS/PSI index values, and SEF trends, and output results (target dosage adjustments for anesthetic agents). This adjustment process is then contrasted to real-world data and expert feedback, allowing refinement of decision-making algorithms.

The ANFIS model is also applied to diverse anesthesia use cases, such as, but non-exclusively general anesthesia, deep sedation, light sedation, opioid-free anesthesia, and anesthesia requiring constant muscle relaxation. For each of these scenarios, the system develops unique sets of membership functions and rule sets, illustrated in FIGS. 2-7. These figures exemplify how the ANFIS model adapts its parameters to suit the specific requirements and goals of each anesthesia protocol, ensuring that the system's outputs are closely aligned with the desired clinical outcomes.

For instance, in general anesthesia, the membership functions might prioritize deeper EEG-based metrics and more aggressive Propofol dosing adjustments, whereas in light sedation, the focus shifts towards maintaining patient respiratory rate and SpO2 with minor drug interventions. Similarly, opioid-free anesthesia scenarios require the system to leverage alternative analgesic inputs and adjust sedative dosing accordingly, without relying on opioids' physiological markers. The constant muscle relaxation case necessitates a unique approach to interpreting neuromuscular blockade data, such as TOF counts, to maintain a steady state of muscle relaxation without compromising safety. This adaptive and case-specific tuning of membership functions and rule sets underline the ANFIS methodology.

Figure 8:
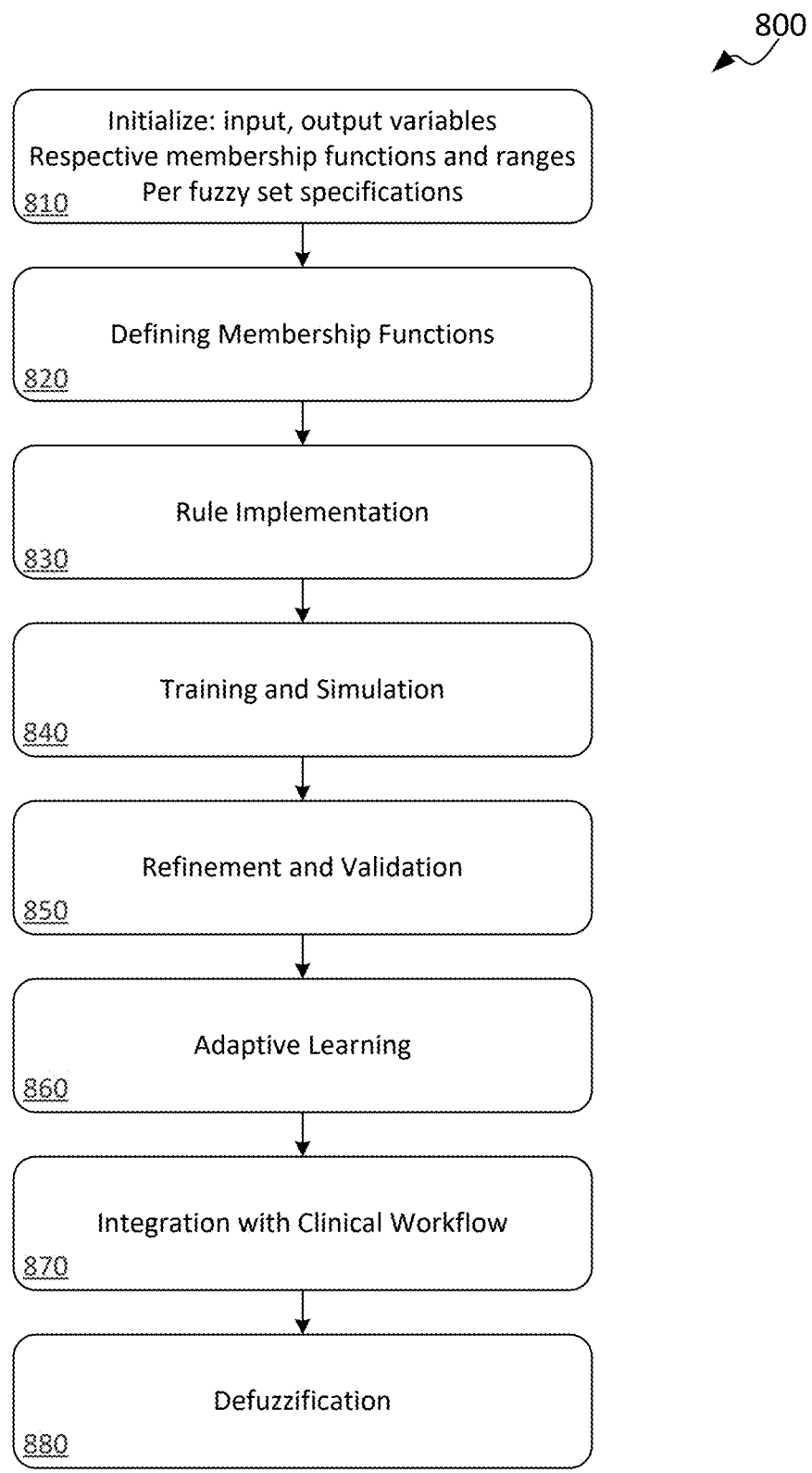
FIG. 8 illustrates a process directed to fuzzy sets for anesthetic drugs and training.

With reference to FIG. 8, the different fuzzy sets for anesthetic drugs and training are addressed in method 800:
1. Initialization of the System The ANFIS model begins with the initialization phase 810, where the input (index of anesthesia depth, pEEG variables, hemodynamic variables, respiratory) and output (target concentration change) variables, along with their respective membership functions and ranges, are defined as per the provided fuzzy set specifications. This step establishes the foundation for the system's learning and adaptation process.

2. Defining Membership Functions

In a defining membership functions step 820, details for both the input (e.g., suppressed, deep anesthesia, optimal, sedation, awake or high pain, low pain, high analgesia, low analgesia) and output (e.g., decrease high, decrease low, maintain, increase low, increase high) variables are defined using Gaussian distributions. These functions capture the nonlinear relationship between the patient's anesthesia depth and the required adjustment in Propofol dosage and the non-linear nature of pEEG index. These rules can account for the non-linear and the non-continuous properties of the input data, which is not possible with other control methods such as PID.

3. Rule Implementation

In a rule implementation step 830, fuzzy logic rules, as outlined, are encoded into the system. These rules are crucial for the decision-making process, determining how the system interprets the input data to make dosing adjustments.

4. Training the System and Simulation

The ANFIS model undergoes training 840, where it is exposed to a simulated dataset comprising examples of expert anesthesiologist decisions under various conditions and simulated monitor signals including simulated EEG waveforms. During this phase, the system adjusts the parameters of the membership functions and the rule weights to minimize the difference between the ANFIS output and the expert decisions. This training can be based on historical data, simulated scenarios, or a combination of both.

5. Refinement and Validation

After the initial training, the system undergoes validation and further refinement 850 using real-world patient data in a clinical setting. This iterative process allows the ANFIS model to fine-tune the membership functions and rule parameters, ensuring that the system's recommendations closely align with the expert-level decision-making for dosing.

6. Adaptive Learning

In adaptive learning step 860, as part of its ongoing operation, the ANFIS model employs adaptive learning mechanisms to continuously update its parameters based on new data and expert feedback. This ensures that the system remains effective and accurate over time, adjusting to changes in clinical practices or patient demographics.

7. Integration with Clinical Workflow

In integration with clinical workflow step 870, the refined ANFIS model, equipped with the fuzzy set for hypnotic, analgesic or muscle relaxant dosing, is integrated into the clinical workflow. It interfaces with patient monitoring systems to receive real-time data (e.g., EEG signals, hemodynamic or TOF information) and uses this information to adjust drugs dosing dynamically, according to the predefined fuzzy logic rules and the adaptive learning outcomes.

8. Defuzzification

In defuzzification step 880, specifically the Center of Area (CoA), is applied to convert the fuzzy output of the system back into a precise dosing recommendation. This step ensures that the system's output is actionable and can be directly applied in the clinical setting.

The methodology can be applied across a wide spectrum of anesthetic techniques and drug combinations, catering to the diverse requirements of modern surgical and procedural sedation practices. This includes, but is not limited to, combinations such as Propofol+Remifentanil+Rocuronium/Vecuronium for general anesthesia, Propofol+Remifentanil for both deep and light sedation, and Propofol alone for light sedation. Furthermore, the system is adept at managing sedation protocols utilizing Dexmedetomidine, Midazolam, and combinations involving Ketamine+Dexmedetomidine+Lidocaine for local anesthesia, as well as more complex regimens like Propofol+Ketamine+Dexmedetomidine+IV Lidocaine for a broad range of anesthesia depths and surgical interventions.

In scenarios where Ketamine and Dexmedetomidine are utilized, the system's capability extends to interpreting EEG data along with its spectrogram trend and stability, providing a crucial parameter for adjusting dosages. This advanced feature ensures that the ANFIS model not only responds to traditional physiological and pharmacokinetic indicators but also integrates neurophysiological feedback directly into the decision-making process. By analyzing EEG spectral dynamics, the system offers a sophisticated mechanism for tailoring anesthetic and sedative dosing to the individual's neurophysiological state, thereby enabling patient-specific customization of anesthesia and sedation protocols. This comprehensive approach underlines the system's capacity to adaptively manage a wide array of drug regimens, further cementing its utility and innovative impact on the field of anesthesiology and patient care. For sedation procedures, the system further incorporates an analysis of the patient's respiratory status as a critical component of its decision-making process. By interpreting parameters such as $CO_2$ curves, respiratory rate (RR), and oxygen saturation ($SpO_2$), the system gains insights into the adequacy of ventilation and oxygenation, which are a priority in sedation management. This data allows the ANFIS model to calculate dynamic adjustments of sedative dosages not only based on neurophysiological and hemodynamic feedback but also considering the patient's respiratory function. The integration of respiratory status parameters ensures that sedation is administered safely, maintaining adequate ventilation and preventing hypoxemia. It provides an additional layer of patient-specific customization, enhancing the system's ability to deliver optimally balanced sedation while minimizing risks associated with respiratory depression. This comprehensive approach to sedation management, incorporating real-time respiratory monitoring, exemplifies the system's capacity for adapting to a broad spectrum of clinical scenarios, thereby optimizing patient safety and procedural outcomes.

Once the training is completed the model is frozen and may be used, by a patient monitor, infusion pump, or anesthesia machine during an actual anesthetic procedure. Meaning that it does not continue to adapt and learn under normal clinical settings. The saved data can be used for future training sessions.

In FIG. 1, "AI training" 148 refers specifically to the discrete, offline periods during which the Adaptive Neuro-Fuzzy Inference System (ANFIS) 950 undergoes supervised training using retrospective datasets composed of annotated clinical cases and/or simulated data. These training sessions are not continuous or patient-specific in real-time, but instead are initiated by the system developers at predetermined intervals during the development or update phases of the system lifecycle. As such, the AI training block exists outside of the live closed-loop control architecture shown in FIG. 1. This design ensures that the ANFIS model does not self-modify during actual patient procedures, preserving the safety and predictability of the system's behavior. The ANFIS model defines the control rules and logic prior to deployment, and once trained and validated, the resulting parameters (e.g., membership functions and fuzzy rule weights) are frozen and deployed in the field as fixed logic. Consequently, the controller does not adapt to every individual patient in real-time, but instead uses generalizable expert-informed models to maintain consistent, clinically validated decision-making across all patients.

Figure 10:
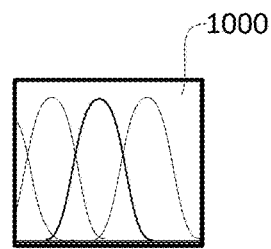
FIG. 10 illustrates a schematic notation used in the present disclosure.

The representations in FIGS. 2-7 serve to illustrate exemplary methodology rather than provide an exhaustive catalog of all possible use cases for this system. Variables to be fuzzified can be different depending on the use case, such as the exemplary use cases shown in FIGS. 2-7. For instance, in FIG. 2, it is shown that the input variables that are fuzzified for propofol are SEF, SR and INDEX with the rules being "change target" or "lower target". Anything that is fuzzified or defuzzified in these figures is shown with the three curves icon 1000 (see, FIG. 10) next to the variable's name. For instance, $SpO_2$ is not fuzzified in FIG. 4, hence it does not have the three curves icon.

Figure 2:
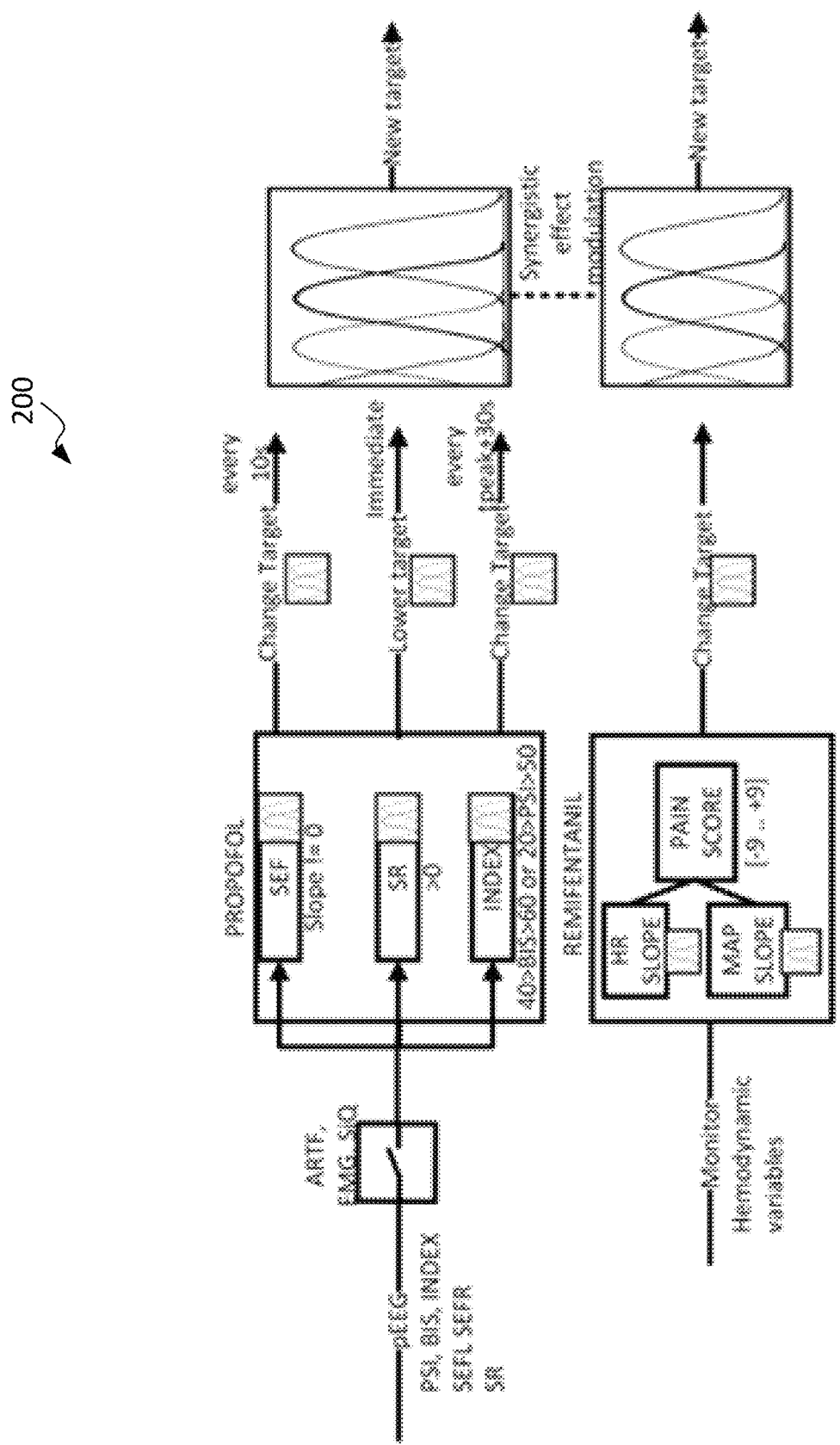
FIG. 2 illustrates aspects of a fuzzy control use case for general anesthesia with propofol and remifentanil.

FIG. 2 illustrates aspects of fuzzy control use case 200 for general anesthesia with propofol and remifentanil. Membership functions are represented with curves, illustrating the degree of change for output functions, and the degree of slope or deviation for input variables. For EEG input, signal quality siQ, artifact index and electromyography index are used as acceptance filter.

Figure 3:
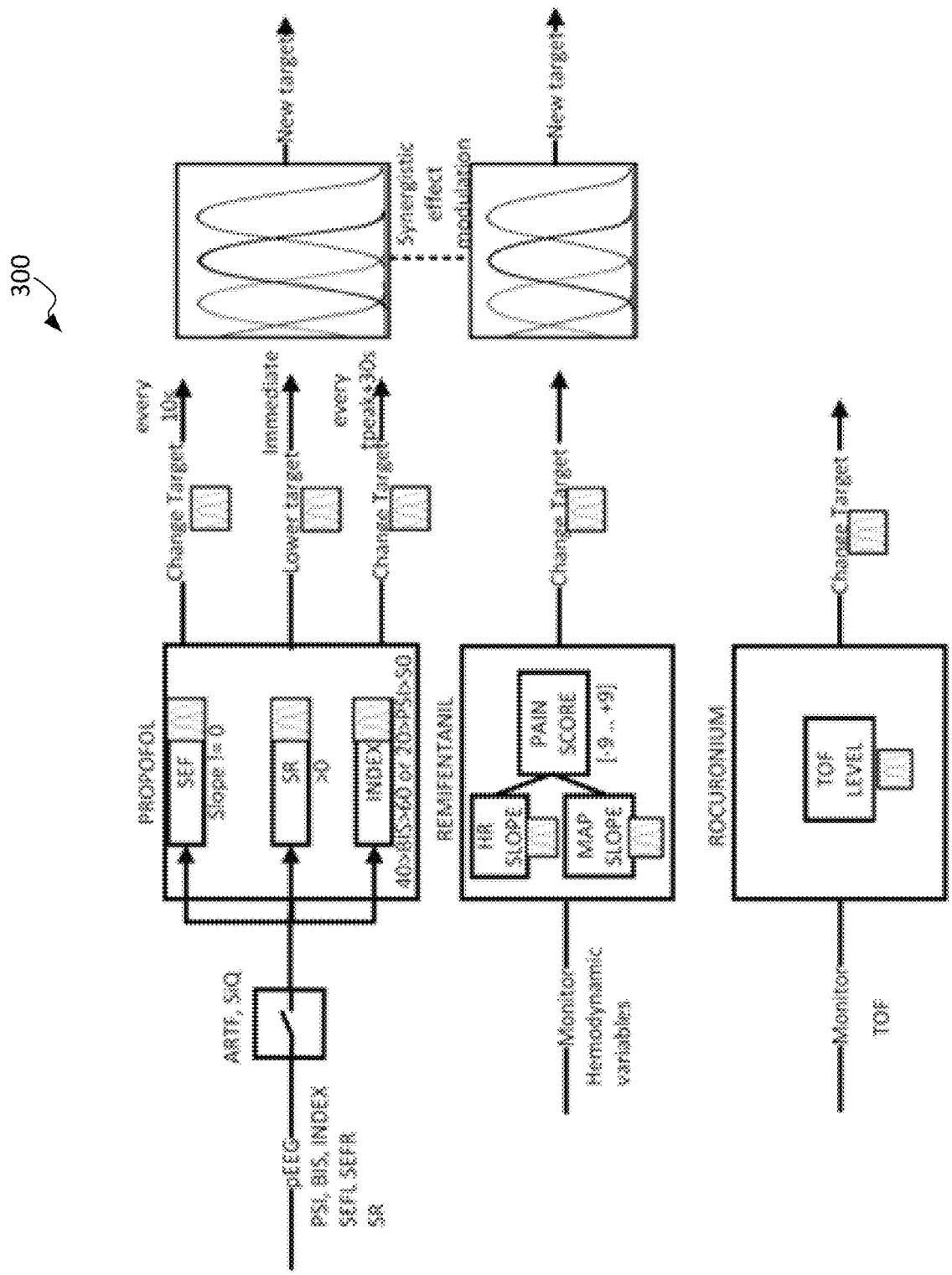
FIG. 3 illustrates aspects of a fuzzy control use case for general anesthesia with propofol, remifentanil and continuous muscle relaxant administration.

FIG. 3 illustrates aspects of fuzzy control use case 300 for general anesthesia with propofol, remifentanil and continuous muscle relaxant administration. The TOF levels and the drug target changes are fuzzified and run through ANFIS.

Figure 4:
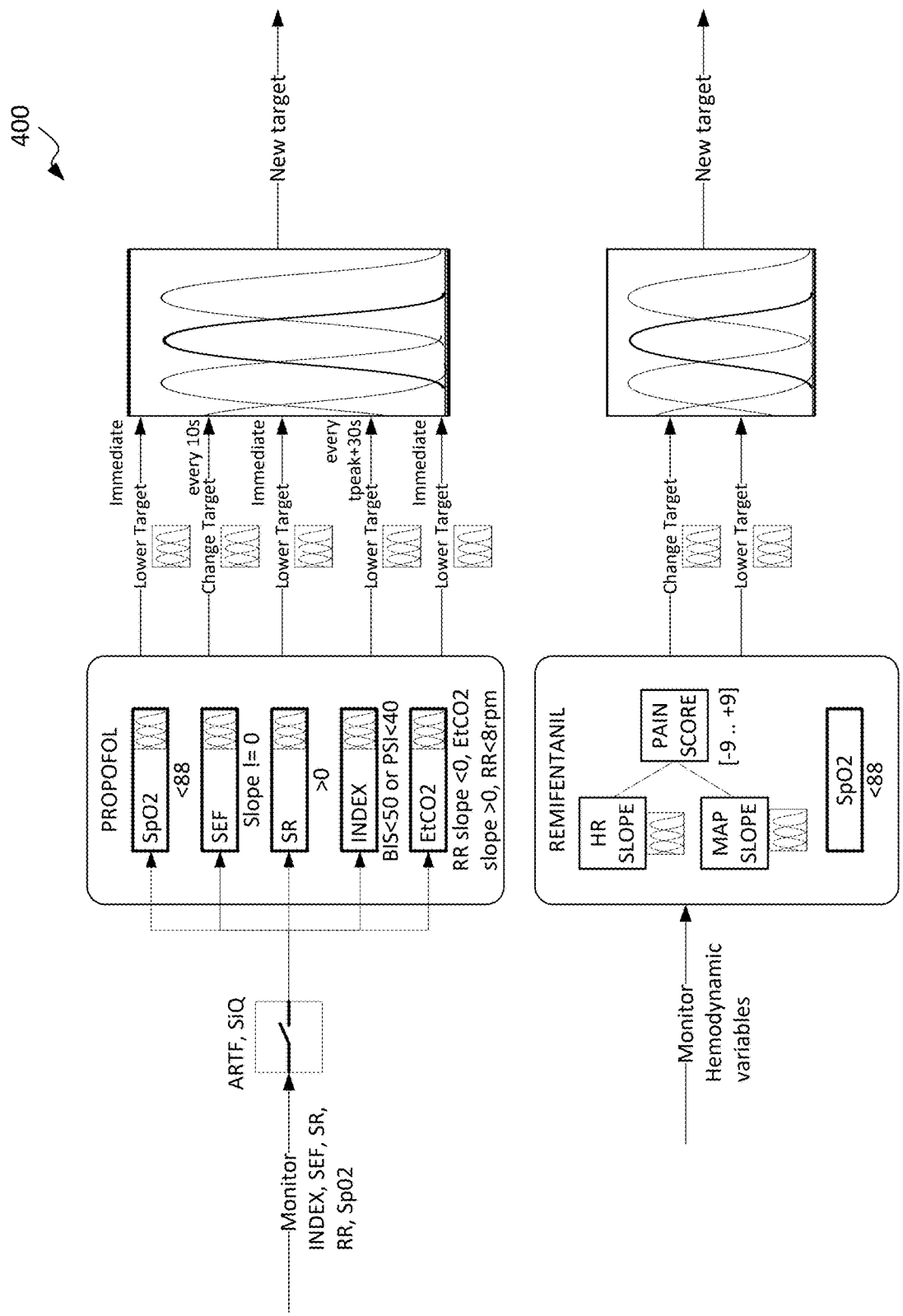
FIG. 4 illustrates aspects of a fuzzy control use case for sedation with propofol and remifentanil.

FIG. 4 illustrates aspects of fuzzy control use case 400 for sedation with propofol and remifentanil. Membership functions are represented with curves, illustrating the degree of change for output functions, and the degree of slope or deviation for input variables. In this case, preventing respiratory depression and oxygen desaturation is priority; these variables have a higher weight on the fuzzy system.

Figure 5:
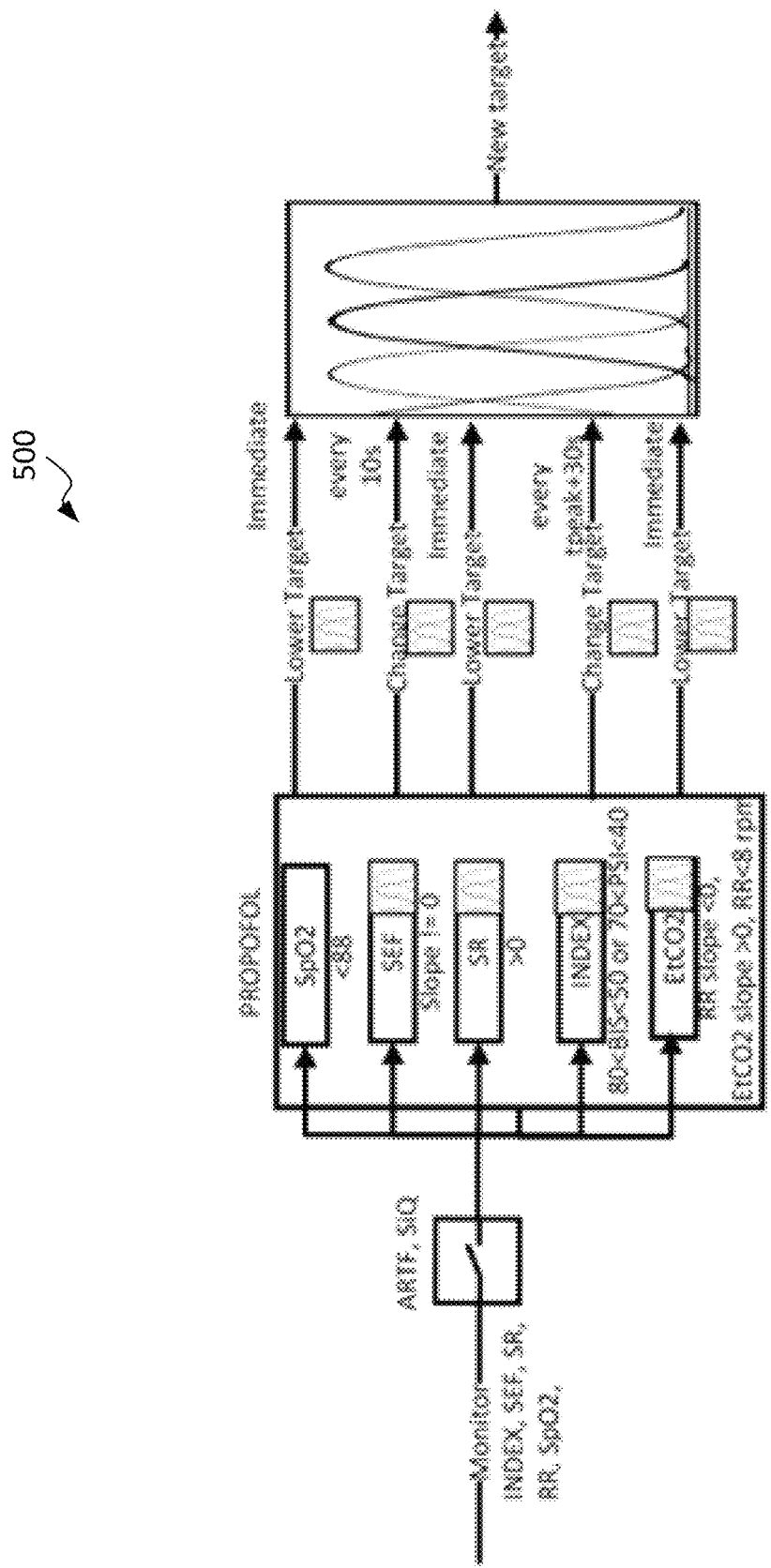
FIG. 5 illustrates aspects of a fuzzy control use case for sedation with propofol.

FIG. 5 illustrates aspects of fuzzy control use case 500 for sedation with propofol. Note that analgesic control is not considered in this case and has to be handled independently by the anesthesiologist. This method is often accompanied by regional anesthesia, which is out of this particular system setup scope.

Figure 6:
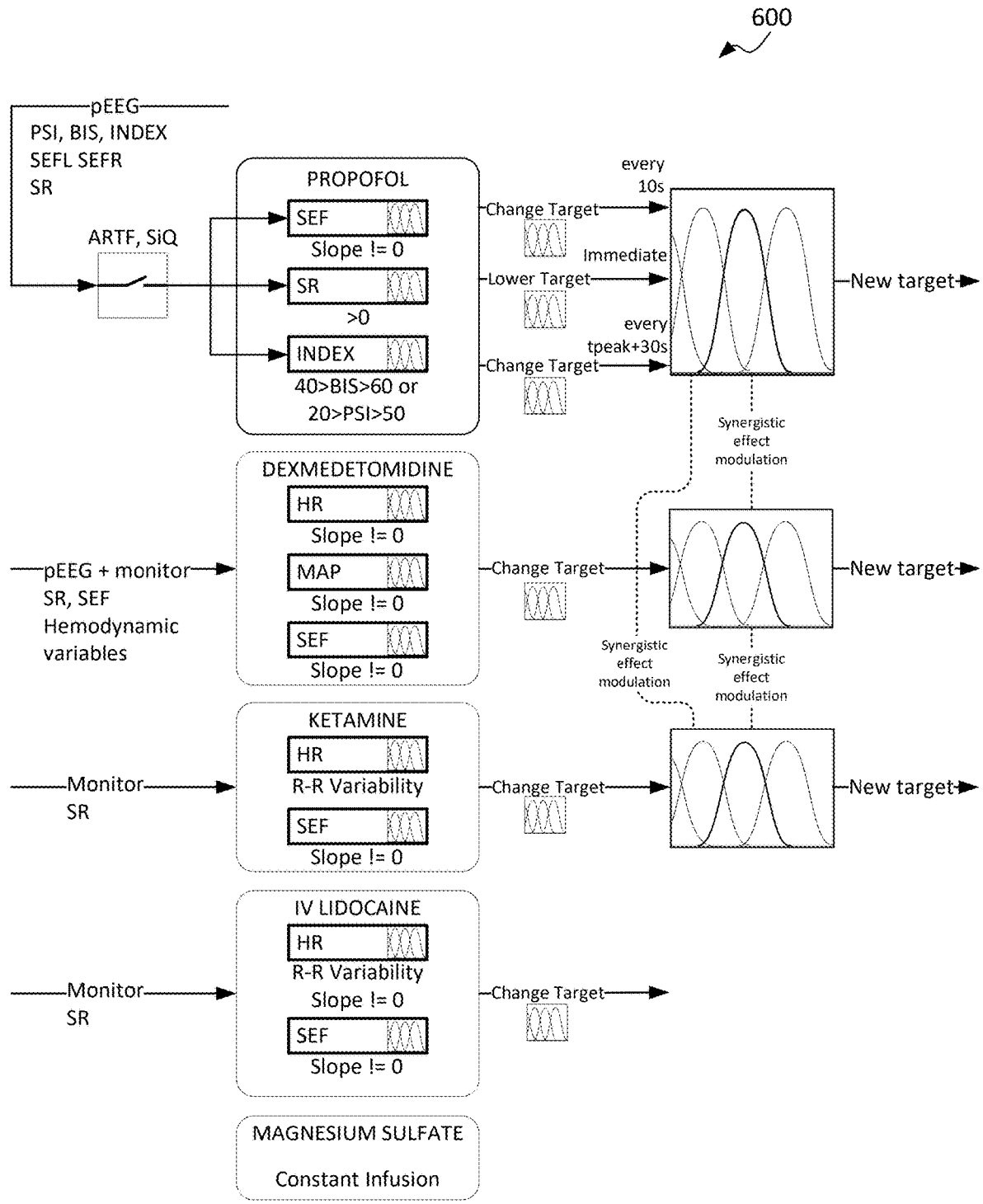
FIG. 6 illustrates aspects of a fuzzy model designed for Multimodal or Opioid-Free Anesthesia (OFA).

FIG. 6 illustrates aspects of fuzzy model 600 designed for Multimodal or Opioid-Free Anesthesia (OFA), a technique that employs a combination of Propofol, Ketamine, Dexmedetomidine, and IV Lidocaine to mitigate pain without the use of opioids. This model strategically utilizes Ketamine and Lidocaine either through continuous infusions or target-controlled infusions to provide a comprehensive analgesic effect from multiple pharmacological perspectives. Specifically, Ketamine may also be administered in small, consecutive, sub-anesthetic doses to enhance pain control while minimizing its psychoactive effects. Additionally, the model incorporates the use of Magnesium Sulfate and IV Acetaminophen (although not depicted in FIG. 6) as adjuncts to augment the analgesic strategy. These agents are selected for their complementary mechanisms of action in achieving effective pain management, aligning with the opioid-free anesthesia objectives. This figure encapsulates the complexity and integrative approach of the OFA fuzzy model, highlighting the system's capability to adaptively manage anesthesia and analgesia through a multimodal regimen, thereby reducing reliance on opioids and their associated risks.

Specifically, FIG. 6 illustrates a process where input variables, selected based on signal quality, including sub-parameters such as Spectral Edge Frequency (SEF), Suppression Ratio (SR), and various anesthesia depth indices (e.g., BIS, PSI, NINDEX), undergo the process of fuzzification and weighting. Subsequently, the dosing change output is also fuzzified. Additionally, outputs from models of other drugs that either exhibit a synergistic effect or influence the same variables (e.g., the effect of Ketamine and Propofol on EEG patterns) are integrated, fuzzified, and weighted to produce a final output decision.

Figure 7:
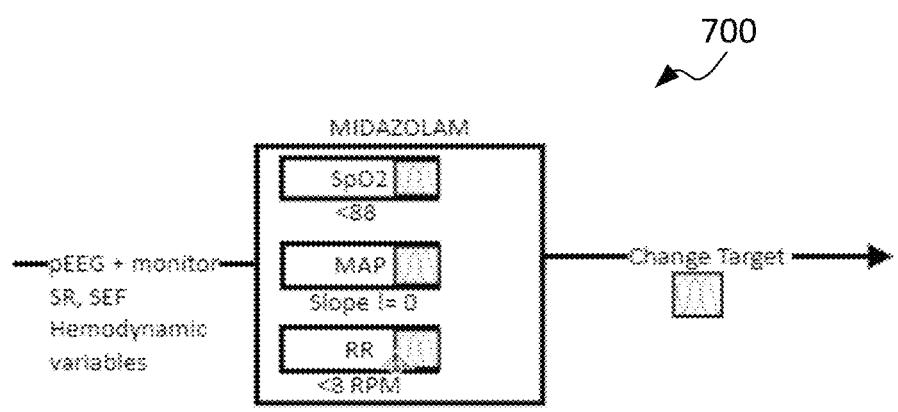
FIG. 7 illustrates aspects of a simple model for midazolam sedation, controlling changes in SEF and respiratory depression events.

FIG. 7 illustrates aspects of simple model 700 for midazolam sedation, controlling changes in SEF and respiratory depression events.

The fuzzy logic diagrams depicted across these figures follow a structured progression: initially setting fuzzy parameters, refining through the ANFIS process based on simulated or clinical data, and then finalizing the fuzzy set configuration. This progression ensures that the system's logic evolves to reflect real-world effectiveness and expert input more accurately.

The example values provided in FIGS. 2-7 should be understood as "fuzzified" interpretations, rather than fixed absolutes, highlighting the flexibility of the system to adapt its thresholds based on ongoing training and data refinement. For instance, an anesthesia depth index range initially set as PSI 20-50 might be adjusted to 25-50, with the system understanding that an index of 22 is not strictly "outside" the target range but partially suppressed, partially within the ideal range, and not considered awake. This approach to interpreting input data underscores the system's adaptability across a variety of clinical scenarios.

Figure 9:
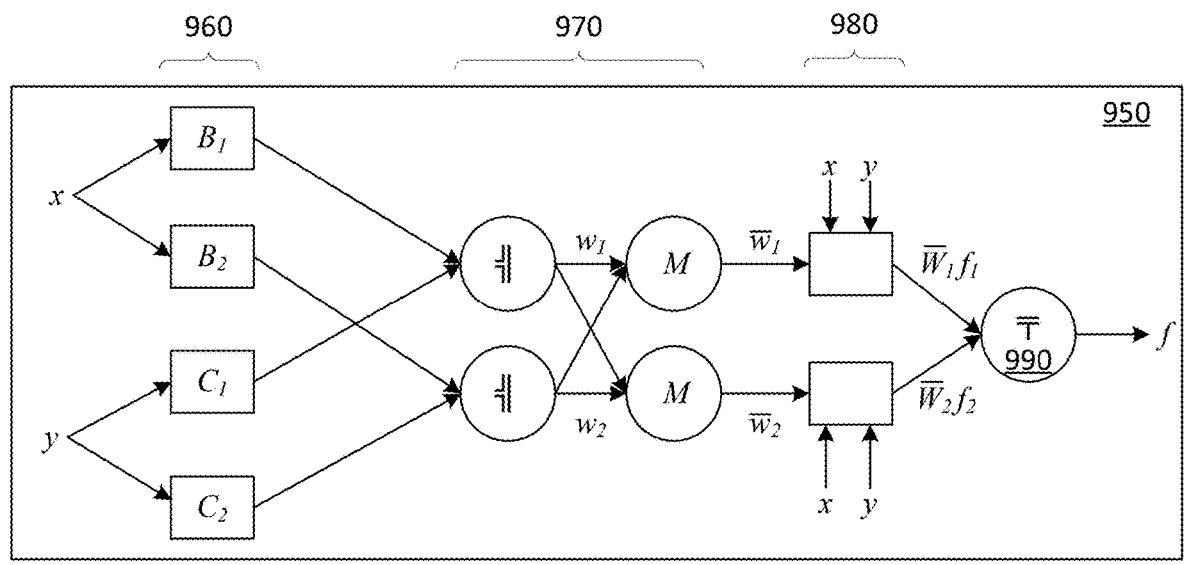
FIG. 9 illustrates an exemplary ANFIS architecture in accordance with aspects of the invention.

With reference to FIG. 9, an exemplary ANFIS 950 architecture usable in embodiments of the present invention is depicted. In this Sugeno-type architecture, first layer 960 (squares) represent "fuzzification" and second layer 970 (circles) represents the "rule layer", followed by defuzzification stage 980 and summation 990 for final output generation $f$.

Computing unit 158 may comprise microcontrollers (e.g., arduino, Raspberri-pi), microprocessors, DSCs (Digital Signal Controller), FPGAs (Field Programmable Gate Array), CPLDs (Complex Programmable Logic Device), ASICs (Application Specific Integrated Circuit), SoCs (System on Chip), PSoCs (Programmable System on Chip), computers, servers, tablets, cell phones, smart phones, signal generators, and other similar or equivalent computing units.

Computing unit 158 may include tangible computer readable media to store physiologic data, AI implementing computer instructions. Computer readable media can include RAM memories (cache, SRAM, DRAM, DDR), ROM memory (Flash, Cache, Hard Drives, SSD, EPROM, EEPROM, removable ROM memories (e.g., SD (miniSD, microSD, etc.), MMC (MultiMedia Card), Compact Flash, SMC (Smart Media Card), SDC (Secure Digital Card), MS (Memory Stick), among others)), CD-ROM, Digital Versatile Discs (DVDs) or other optical storage, magnetic cassettes, magnetic tapes, storage or any other media that can be used to store information to be accessed by computing unit 158.

In addition, computing unit 158 may include input/output devices and a communications module configured to exchange data with infusion pump 120 and/or with anesthesia monitor 130. The communications module may comprise wired communication modules, wireless communication modules, and wired and wireless communication modules.

Examples of wireless communication modules are modules that use a wireless communication technology such as Bluetooth, WiFi, Radio Frequency RF ID (standing for Radio Frequency Identification), UWB (Ultra-Wide Band), GPRS, Konnex or KNX, DMX (Digital Multiplex), WiMax and equivalent wireless communication technologies.

Similarly, a wired communications module has a wired connection port that allows for communication with external devices through a communications bus, which may be I2C (for the acronym of IIC Inter-Integrated Circuit), CAN (Controller Area Network), Ethernet, SPI (Serial Peripheral Interface), SCI (Serial Communication Interface), QSPI (Quad Serial Peripheral Interface), 1-Wire, D2B (Domestic Digital Bus), Profibus, USB, Thunderbolt, and others known to a person skilled in the art.

Additionally, computing unit 158 can communicate with fluid infusion pump 120 and/or with the anesthesia monitor 130 through one or more communication protocols such as AS-i in accordance with the standard International IEC62026-2, Bristol Standard Asynchronous Protocol (BSAP), CC-Link Industrial Networks, CIP (Common Industrial Protocol), CAN bus (Controlled Area Network) such as CAN open and DeviceNet, ControlNet, DF-1, DirectNET, EtherCAT, Ethernet Global Data (EGD), Ethernet Powerlink, Ethernet/IP, FINS FOUNDATION type fieldbus (e.g., HI, HSE), GE SRTP (Service Request Transport Protocol), HART (Highway Addressable Remote Transducer) protocol, Intelligent Distributed System (Honeywell SDS), HostLink, INTERBUS, IOLink, MECHATROLINK, MelsecNet, Modbus, Modbus RTU, Modbus ASCII, Modbus TCP/IP or Modbus TCP, Modbus over TCP/IP or Modbus over TCP or Modbus RTU/IP, Modbus over UDP, Modbus Plus (Modbus+, MB+ or MBP), Pemex Modbus, Enron Modbus, Optomux, Process Image Exchange Protocol (PieP), Profibus, PROFINET IO, RAPIEnet (Real-time Automation Protocols for Industrial Ethernet), SERCOS interface, SERCOS III, Since HI, SynqNet, or Time-Triggered Ethernet (SAE AS6802).

On the other hand, the present invention also relates to a computer program comprising instructions, which when the program is executed in a system pursuant to any of the embodiments previously described, cause said system to perform the steps of a method according to any of the embodiments of the methods previously described in this invention.

Computer programs for carrying out aspects of the present invention may be written in any programming language or framework known by a person skilled in the art. For example, the computer program may be written in Java, JavaScript, Perl, PHP, and C++, #C, Python, R-studio SQL, Swift, Ruby, Delphi, Visual Basic, D, HTML, HTML5, CSS, NodeJs, Angular, React, Go, RPA, NET, Scala, Drupal, Ember, and Labview.

Abbreviated terminology used in the present disclosure:

| | |
|---|---|
| ARTF | Signal Artifact |
| BIS | Bispectral index |
| EMG | electromyography |
| etCO2 | end tidal CO2 |
| HR | heart rate |
| INDEX | Anesthetic depth index (0-100) |
| MAP | Mean arterial pressure |
| pEEG | processed electroencephalography |
| PK | Pharmacokinetic |
| PSI | patient state index |
| RR | respiration rate |
| SEF | spectral edge frequency |
| SEFL | spectral edge frequency left side |
| SEFR | spectral edge frequency right side |
| SiQ | signal quality |
| SpO2 | oxygen saturation |
| SR | suppression rates |
| TOF | Train-of-four |

What is claimed is:

1. A system for automated anesthetic or sedation drug delivery to a patient comprising:
an infusion pump connectable to the patient and configured to deliver the drug to the patient at a controllable infusion rate;
a patient monitor connectable to the patient to monitor a plurality of physiologic measures of the patient, including electroencephalogram (EEG) measures, hemodynamic parameters, capnography, and pulse oximetry; and
a controller coupled to the infusion pump to control the controllable infusion rate and coupled to the patient monitor to receive the plurality of physiologic measures of the patient;
wherein the controller is configured to adjust the infusion rate based on the plurality of physiologic measures of the patient by applying an Adaptive Neuro-Fuzzy Inference System (ANFIS) that has been trained on a retrospective dataset comprising a plurality of anesthesiologist decisions and physiologic conditions correlated to each of the anesthesiologist decisions, including EEG signals, hemodynamic parameters, capnography, and pulse oximetry; and
wherein training the ANFIS includes adjusting fuzzy logic parameters thereof to arrive at an adapted final fuzzy set.

2. A system for automated anesthetic or sedation drug delivery to a patient comprising:
one or more infusion pumps, each configurable to be in fluid communication with the patient to deliver a pump-specific drug to the patient at a drug-specific controllable infusion rate;
a patient monitor connectable to the patient to monitor a plurality of physiologic measures of the patient, including electroencephalogram (EEG) measures; and
a controller coupled to the one or more infusion pumps to control each of the drug-specific controllable infusion rates and coupled to the patient monitor to receive the physiologic measures of the patient;
wherein the controller is configured to adjust each of the drug-specific infusion rates based on the physiologic measures of the patient by applying an Adaptive Neuro-Fuzzy Inference System (ANFIS) that has been trained on a dataset comprising a plurality of anesthesiologist decisions and physiologic conditions correlated to each of the anesthesiologist decisions, including EEG signals; wherein training the ANFIS includes adjusting fuzzy logic parameters thereof to arrive at an adapted final fuzzy set.

3. The system for automated anesthetic or sedation drug delivery to a patient according to claim 2 wherein the physiologic measures and the physiologic conditions correlated to each of the anesthesiologist decisions further comprise hemodynamic parameters, capnography, and pulse oximetry.

4. The system for automated anesthetic or sedation drug delivery to a patient according to claim 2 wherein the ANFIS is initialized with establishment of initial fuzzy logic parameters, defining and adjusting membership functions and rules based on expert anesthesiologist input and predefined clinical protocols.

5. The system of claim 4, wherein defining and adjusting membership functions and rules for both input variables and output variables covers clinical scenarios of general anesthesia, deep sedation, light sedation, opioid-free anesthesia, and constant muscle relaxation.

6. The system of claim 4, wherein the patient monitor further monitors Train-Of-Four (TOF) measures of the patient, the pump-specific drug of one of the one or more infusion pumps is a muscle relaxant drug, and the physiologic conditions in the dataset further comprise muscle relaxant anesthesiologist decisions and TOF conditions correlated to each of said muscle relaxant anesthesiologist decisions.

7. The system for automated anesthetic or sedation drug delivery to a patient according to claim 2 wherein the dataset represents one or both of (1) retrospective clinical patient anesthesia or sedation sessions data and (2) retrospective simulated anesthesia or sedation sessions.

8. The system for automated anesthetic or sedation drug delivery to a patient according to claim 2, wherein the one or more infusion pumps are configurable to infuse a corresponding one or more of Propofol, Ketamine, Dexmedetomidine, and IV Lidocaine.

9. The system for automated anesthetic or sedation drug delivery to a patient of claim 8 wherein the controller is further configured to adjust each of the one or more infusion pumps individually or in combination to achieve desired anesthesia or sedation levels without using opioids.

10. The system for automated anesthetic or sedation drug delivery to a patient according to claim 2 wherein the physiologic measures and the physiologic conditions correlated to each of the anesthesiologist decisions further comprise respiratory status parameters including CO2 curves, respiratory rate (RR), and oxygen saturation (SpO2).

11. The system for automated anesthetic or sedation drug delivery to a patient according to claim 2, wherein the controller is further configured to defuzzify fuzzy logic outcomes to control each of the drug-specific controllable infusion rates.

12. The system for automated anesthetic or sedation drug delivery to a patient according to claim 2, wherein the one or more infusion pumps are configurable to infuse a combination of drugs selected from the group of combinations consisting of propofol+remifentanil+rocuronium/vecuronium for anesthesia, propofol+remifentanil for deep sedation or, light sedation, Dexmedetomidine for sedation, and ketamine+Dexmedetomidine+lidocaine for local anesthesia.

13. The system for automated anesthetic or sedation drug delivery to a patient according to claim 2, wherein EEG measures and EEG signals comprise raw EEG data and its spectrogram trend and stability.

14. The system according to claim 2, wherein the physiologic measures and the physiologic conditions correlated to each of the anesthesiologist decisions further comprise hemodynamic parameters and the pump-specific drug of one of the one or more infusion pumps is an analgesic.

15. The system of claim 2, wherein the controller is further configured to utilize refined fuzzy parameters to adjust a target concentration of a pump-specific anesthetic drug based on an internationally accepted pharmacokinetic (PK) models and Target-Controlled Infusion (TCI) systems for administering said target concentration and dosage changes in real-time.

16. A method for configuring a controller to adjust drug-specific infusion rates based on patient physiologic conditions in an automated anesthetic or sedation drug delivery system comprising:
associating input and output variables with respective membership functions and ranges according to fuzzy set specifications in an Adaptive Neuro-Fuzzy Inference System (ANFIS), said input variables including index of anesthesia depth, pEEG condition, hemodynamic condition, and respiratory condition and said output variables including target concentration change;
defining membership functions for said input variables and output variables, said membership functions for input variables including suppressed, deep anesthesia, sedation, awake or high pain, low pain, high analgesia, low analgesia and said membership functions for output variables including decrease high, decrease low, maintain, increase low, increase high;
implementing fuzzy logic rules to determine system interpretation of data associated with said input variables to adjust target concentration change to create an ANFIS model;
training the ANFIS model on a dataset comprising a plurality of anesthesiologist decisions and patient physiologic conditions correlated to each of the anesthesiologist decisions; and
validating and refining the ANFIS model by utilizing the controller in a clinical setting under anesthesia practitioner supervision, said refining including fine-tuning of membership functions and rule parameters to align with said supervision.

17. A method for providing automatically adjusted drug-specific infusion rates based on patient physiologic conditions using the controller configured according to the method of claim 16, said method comprising:
connecting an infusion pump to the patient, said infusion pump configured to deliver the drug to the patient at a controllable infusion rate determined by the controller;
connecting a patient monitor to the controller and to the patient to provide the controller with pEEG, hemodynamic condition, and respiratory condition; and
providing an initial index or target to the controller.

* * * * *